United States Patent [19]

Bouillot et al.

[11] Patent Number: 4,821,387

[45] Date of Patent: Apr. 18, 1989

[54] METHOD OF MANUFACTURING COOLING FILM DEVICES FOR COMBUSTION CHAMBERS OF TURBOMACHINES

[75] Inventors: Pierre A. P. Bouillot, Yerres; Claude A. L. Genet, Vigneux, both of France

[73] Assignee: Societe Nationale D'Etude et de Construction de Moteurs D'Aviation "S.N.E.C.M.A.", Paris, France

[21] Appl. No.: 101,014

[22] Filed: Sep. 25, 1987

[30] Foreign Application Priority Data

Sep. 25, 1986 [FR] France .................. 86 13370

[51] Int. Cl.$^4$ .................. B21K 29/00; B23P 15/26
[52] U.S. Cl. .................. 29/157 C; 29/558; 60/757
[58] Field of Search .................. 29/557, 558, 157 C, 29/156.4 R, 156.8 R; 60/757

[56] References Cited

U.S. PATENT DOCUMENTS

| | | | |
|---|---|---|---|
| 2,658,337 | 11/1953 | Clarke et al. .................. | 60/757 X |
| 3,369,363 | 2/1968 | Campbell .................. | 60/757 |
| 3,420,058 | 1/1969 | Howald et al. .................. | 60/757 |
| 3,729,793 | 5/1973 | Schmidt et al. .................. | 29/157 C |
| 3,811,276 | 5/1974 | Caruel et al. .................. | 60/757 |
| 3,995,422 | 12/1976 | Stamm .................. | 60/757 |
| 4,329,848 | 5/1982 | Caruel et al. .................. | 60/757 |
| 4,485,630 | 12/1984 | Kemworthy .................. | 60/757 |

FOREIGN PATENT DOCUMENTS 1270889  6/1968  Fed. Rep. of Germany ........ 60/757

Primary Examiner—Charlie T. Moon
Attorney, Agent, or Firm—Oblon, Fisher, Spivak, McClelland & Maier

[57] ABSTRACT

A method of manufacturing a cooling film device for the combustion chamber of a turbomachine is described in which a blank is machined to provide a substantially cylindrical upstream wall and an enlarged downstream part of generally frusto-conical shape, an inner recess open at the downstream end is machined in the downstream part to constitute an inner wing and an outer wing, the wings are machined and deformed to define a settling chamber which converges in the downstream direction to an annular outlet slit, and the radial upstream end wall of the settling chamber is drilled to provide a plurality of small air inlet holes.

7 Claims, 6 Drawing Sheets

METHOD OF MANUFACTURING COOLING FILM DEVICES FOR COMBUSTION CHAMBERS OF TURBOMACHINES

BACKGROUND OF THE INVENTION

1. Field of the Invention

The present invention relates to the parietal cooling of the walls of combustion chambers of turbomachines, and more precisely to a method of manufacturing a device for creating an inner parietal cooling film for a combustion chamber wall. For the sake of simplicity, the device for creating the parietal film (i.e. the annular member having an annular chamber provided with a row of air inlet apertures and an annular outlet slit through which air enters the combustion chamber) is hereinafter referred to as "the cooling film device".

2. Summary of the Prior Art

The internal temperature of turbomachine combustion chambers is very high and it is current practice to use the principle known as "film cooling" to cool the walls of the chamber. This involves projecting a film of air over the internal face of the wall so as to protect it from the direct action of the flame.

The main problem posed by this process is that of slowing down sufficiently to a desired speed, equal to that of the gases in the combustion chamber, the internal cooling air so that it flows along the inner face of the wall to be cooled and forms an even film thereon. The Applicant has already proposed a solution to this problem in U.S. Pat. No. 4,329,848 wherein an annular protuberance is formed in which a radial portion of its wall is perforated with several rows of air inlet openings in a staggered arrangement, the air flowing along the downstream wall of the chamber through an annular slit provided between said wall and an inner downstream tongue.

The present invention proposes a method of constructing this type of cooling film device which is easy to carry out.

In the combustion chambers of modern high output turbomachines, the dimensions of the chambers have been able to be decreased, but this reduction of dimensions, advantageous to the weight/power performance ratios of the turbomachine, increases the difficulties of construction of said chambers.

Indeed, the annular members from which the combustion chambers are made must form geometrical structures substantially identical with those of the members of larger volume chambers, but in considerably reduced dimensions. Consequently, the conventional methods of construction are very difficult to carry out.

Among these conventional methods mention may be made of U.S. Pat. No. 4,109,459 in which the cooling film device is formed in two parts, the upstream wall and the tongue being constituted by the downstream edge of an inner upstream annular member, whereas the body of the annular pocket and the downstream wall are constituted by a downstream annular member surrounding the inner upstream member on which it is welded. U.S. Pat. No. 4,485,630 discloses a simplification of this method of construction, still with a cooling film device in two parts.

FR Pat. No. 2,440,524 also shows cooling film devices, but of which the construction does not present any particular difficulties as the downstream shells of the combustion chamber have a diameter decidedly greater than that of the upstream shells which they surround, and the air inlet pocket of the cooling film device has no inlet protuberance, nor a downstream annular slit which is narrowed relative to the pocket.

One object of the present invention is to provide, in simple manner, an annular pocket for the admission of air and the settling down of the cooling film, of a diameter more substantial than that of the downstream annular slit for the ejection of the air into the combustion chamber, and in an annular member producing a monobloc cooling film device as opposed to a two-part device as in the above-mentioned patents, this with a view to increasing appreciably the structural rigidity of the device while simplifying the structure of the walls of the combustion chambers.

A further object of the invention is to permit the production of cooling film devices of very small dimensions which retain the properties of large volume devices, of which the methods of construction are not readily adaptable to present smaller devices.

SUMMARY OF THE INVENTION

According to the invention there is provided a method of manufacturing a cooling film device of short length for a large diameter combustion chamber of an aircraft turbo-engine, said cooling film device comprising an upstream wall of substantially cylindrical shape, a downstream wall, a tongue extending downstream from said upstream wall, said downstream wall and said tongue defining therebetween an annular chamber and a downstream annular outlet slit from said chamber for communication with the inside of said combustion chamber, and means defining a plurality of air inlet holes to said annular chamber, said method including the steps of:

(a) making an annular blank on a lathe, said blank having an upstream part of generally cylindrical shape and an enlarged downstream part of generally cylindro-frusto-conical shape;

(b) machining in said downstream part a frusto-conical recess opening in the downstream direction, thereby providing said downstream part with an inner portion having an axis which merges with that of said blank, a radial portion, and an outer portion with double curvature bounding said recess, said inner and outer portions defining inner and outer downstream wings;

(c) deforming at least one of the said inner and outer downstream wings to form on the one hand said downstream wall of said cooling film device, and on the other hand said inner tongue, thereby defining said annular chamber and said outlet slit therefrom;

(d) drilling rows of holes in said radial portion separating said tongue and said downstream wall.

Further according to the invention there is provided a cooling film device for the inner or outer shell of an annular combustion chamber of a turbomachine of large diameter, the device being manufactured by the method of the invention and comprising an upstream wall of substantially cylindrical shape, a downstream wall, a radial part interconnecting said upstream and downstream walls, a tongue extending in a downstream direction from said upstream wall and defining with said radial part and said downstream wall an annular settling chamber, said radial part having means defining a plurality of air inlet holes opening into said settling chamber, and said downstream wall and said tongue defining therebetween an annular outlet slit at the downstream end of said settling chamber, said chamber converging towards said outlet slit.

Still further according to the invention there is provided an annular combustion chamber for an aircraft turboengine having in at least one of the internal and external walls of the chamber at least one annular cooling film device made in accordance with the invention, said film device being welded between upstream and downstream annular members of the chamber wall.

Other features of the invention will become apparent from the following description of preferred embodiments and with reference to the accompanying drawings.

DESCRIPTION OF THE PREFERRED EMBODIMENTS

Figure 1:
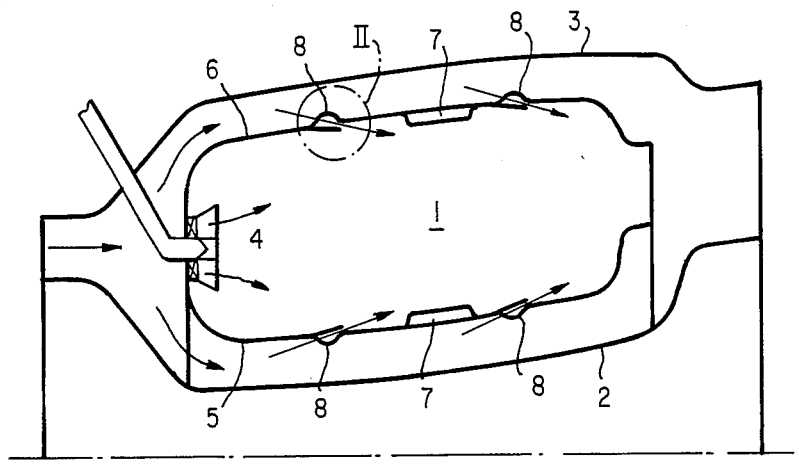
FIG. 1 shows, in diagrammatic form, a longitudinal half-section of an annular combustion chamber having a cooling film device made by the method of the invention.
Figure 2:
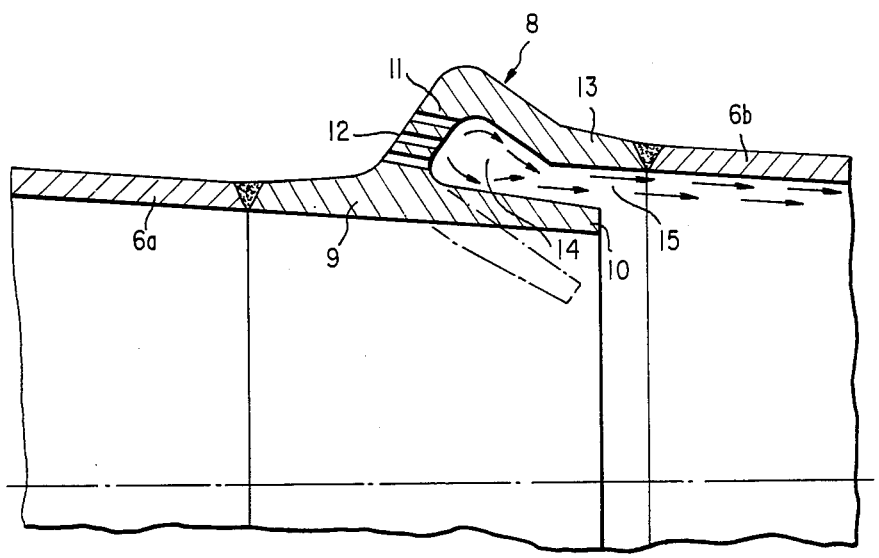
FIG. 2 shows the detail II FIG. 1 to a larger scale.

Referring to FIG. 1, an annular combustion chamber 1 is disposed between an inner housing 2 and an outer housing 3 delimiting an air stream flowing from a compressor, not shown. A fraction of the compressed air enters the combustion chamber through a combined air and fuel injection device 4, for the air-fuel mixture to be burnt in the chamber, whereas the remaining fraction of compressed air surrounds the inner 5 and outer 6 walls of the chamber. A part of this air enters the chamber 1 through dilution apertures 7, whereas another part is picked up by cooling film devices 8 located in the walls 5 and 6 of the chamber and constructed as illustrated in FIG. 2.

Film device 8 has an upstream wall 9 extended in the downstream direction to form an inner tongue 10, a radial part 11 perforated with air inlet holes 12, and a downstream wall 13. The tongue 10, the radial part 11, and the downstream wall 13 are shaped in such a manner that between them an annular chamber or pocket 14 is formed which converges downstream so as to slow down and stabilize the air which enters through the holes 12 so that the air film issuing from an annular outlet slit 15 formed between the downstream wall 13 and the inner tongue 10 is stable and proceeds at a speed substantially equal to that of the flow of air issuing from the injection device 4, whereby the inner parietal cooling film of the chamber is not laminated and, in the end, destroyed in its upstream-downstream movement by the air-fuel mixture consumed in the chamber.

Figure 3A:
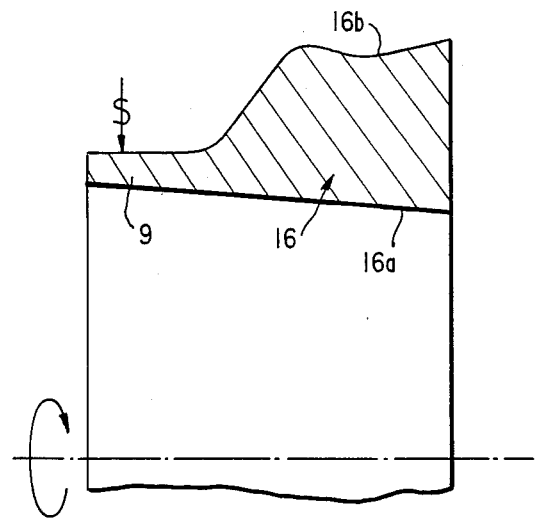
FIGS. 3a to 3e illustrate stages of one example of the method in accordance with the invention for making a cooling film device for an outer shell of an annular combustion chamber; and, FIGS. 4a to 4d illustrate stages of another example of the method in accordance with the invention for making a cooling film device for an outer shell of an annular combustion chamber.

To produce this structure, according to a first embodiment of the invention, a blank (FIG. 3a) is machined from a circular shell, the blank having a tubular cylindrical upstream part which will form the upstream wall 9 of the device after machining, and a downstream part 16 which is of substantial thickness and has a generally frusto-conical shape converging downstream towards the axis of the shell. FIGS. 3a for the outer shell of an annular or tubular combustion chamber.

The inner surface 16a of the downstream part 16 is machined as an extension of the internal surface of the upstream tubular wall 9, whereas the external surface 16b has a double curvature, firstly converging in its central region, and then diverging in its downstream region.

Figure 3B:
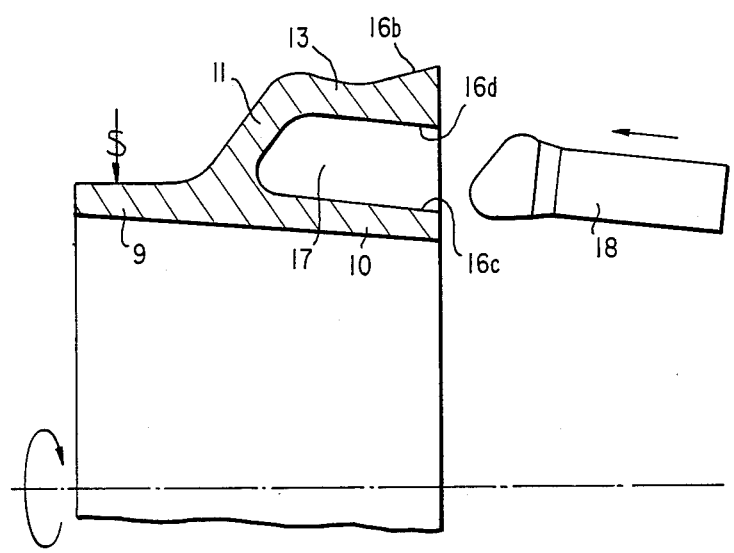

In the next stage shown in FIG. 3b, with the blank still held by its upstream part 9 in the clamp of the turning lathe, the downstream part 16 is machined by means of a cutting tool 18 to form a frusto-conical recess 17 which opens in the downstream direction and has its inner faces 16c and 16d parallel to each other or divergent. There are thus defined between the inner surface 16a of the part 16 and the inner face 16c of the recess 17 an inner frusto-conical wing 10, and between the outer surface 16b of the part 16 and the inner face 16d of the recess a frusto-conical outer wing 13. At the same time, a central radial part 11 is formed which constitutes the bottom end of the recess 17.

Figure 3C:
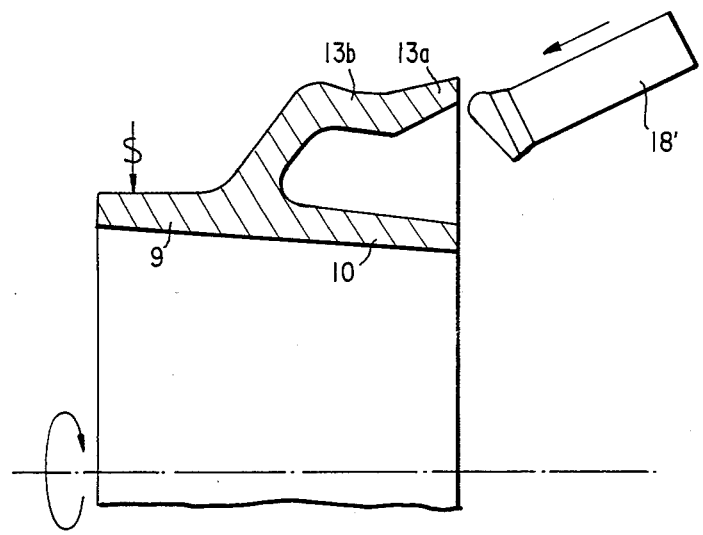

Then, with a differently orientated tool 18' the downstream end of the outer wing 13 is thinned by machining its inner face 16d parallel, or nearly. parallel, with the downstream diverging region of the outer surface 16b as shown in FIG. 3c.

Figure 3D:
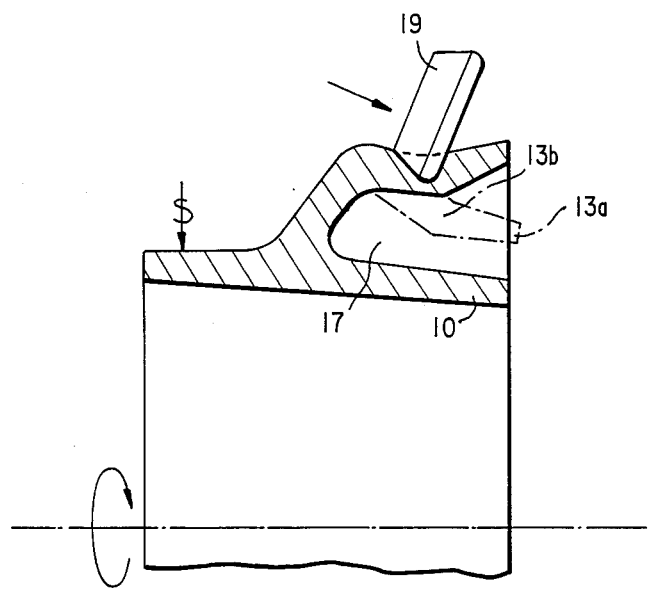

In the next stage shown in FIG. 3d the outer wing 13 is deformed in its centre region 13b by means of a knurling wheel 19 rotating about itself and acting externally on the blank until the downstream portion 13a is substantially parallel to the inner tongue 10. The portion 13a thus shaped will constitute the downstream wall of the cooling film device.

In an alternative embodiment shown in FIGS. 4a to 4d, a difference is seen compared with the above embodiment in that the blank comprises a downstream part of which the inner surface 16'a is frusto-conical and converges downstream towards the axis of the device, while the outer surface 16'b still has a double curvature and is machined at the very outset to the final outer shape of the external downstream wing.

If it is desired to make a cooling film device for the inner shell of an annular chamber (as opposed to the outer shell as described above), then the downstream part 16' of the blank must be orientated so that it diverges relative to the rotation axis of the blank. In both cases, however, the angle α of divergence or convergence relative to the axis of symmetry of the shell is preferably between 30 and 50 degrees.

Figure 4A:
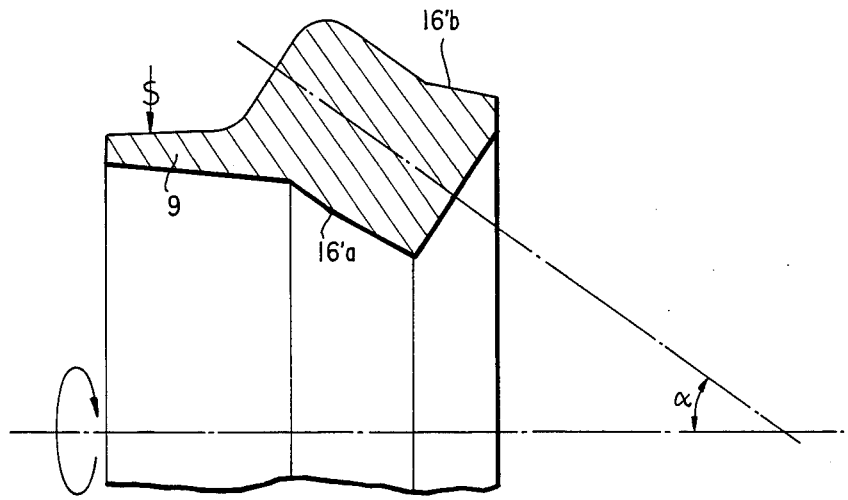
Figure 4B:
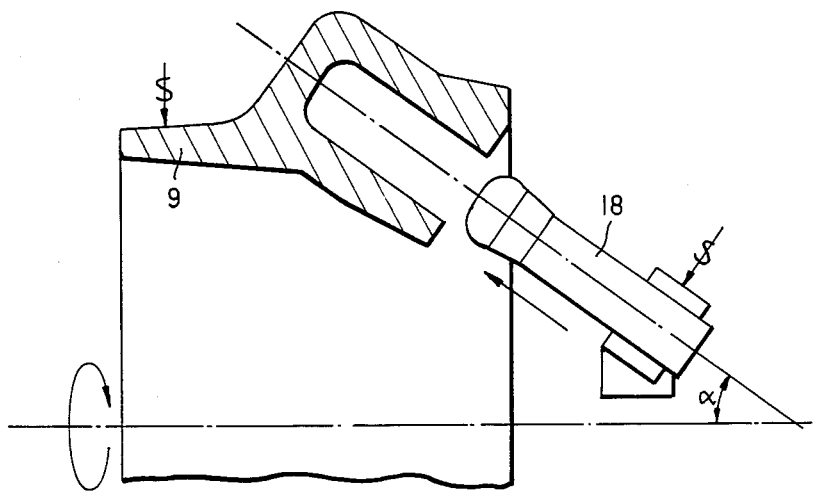
Figure 4C:
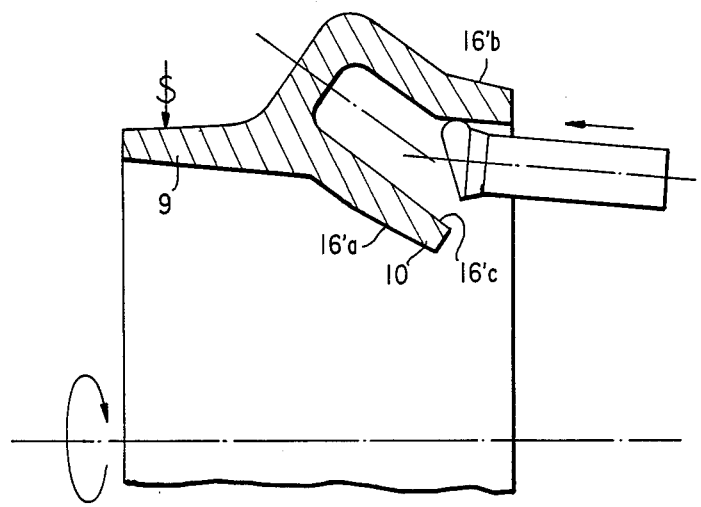
Figure 4D:
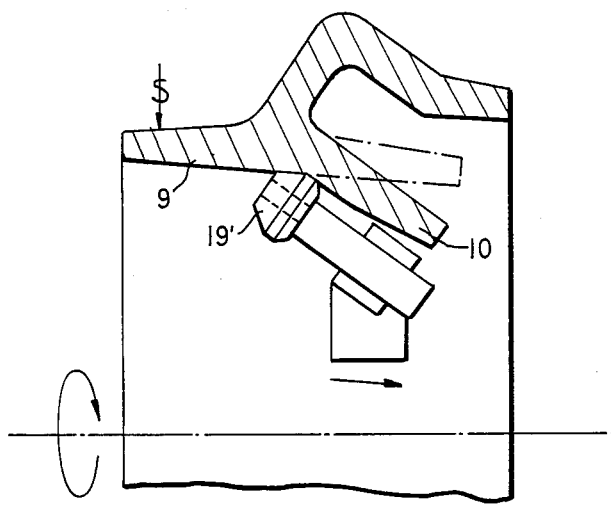

The machining operations forming the recess 17 shown in FIGS. 4b and 4c correspond to those of FIGS. 3b and 3c, but following these it is the inner wing 10 which is turned in by a knurling wheel 19' acting internally on the blank, to shape the downstream tongue along its entire length parallel to the shaped downstream portion 13a of the outer wing 13.

Figure 3E:
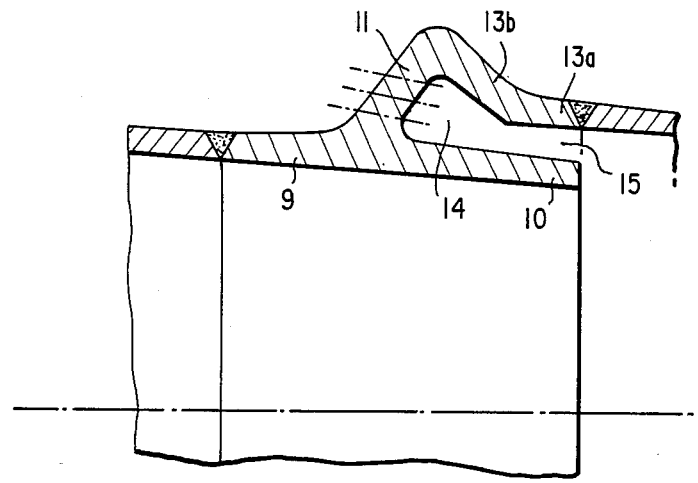

This forms, in a similar manner in both embodiments, an annular chamber 14 between the tongue 10 formed from the inner wing, the bottom 11 of the recess 17 of the blank, the frusto-conical part 13b of the outer wing, and the substantially cylindrical part 13a coaxial with the tongue 10. The chamber 14 converges downstream and opens through an annular outlet slit 15 (FIGS. 2 and 3e) formed between the tongue 10 and the downstream wall 13a. The shaping operations by knurling are carried out simply, without extrusion of material, and do not require complex equipment. Indeed, a centre lathe is adequate to carry out all the machining operations.

According to the geometrical configuration of the cooling film device to be made, which depends upon the position it must take in a combustion chamber (i.e. on the outer or inner wall of an annular chamber, on a cylindrical wall in the primary region, or on a conical wall in the mixing region or in the downstream dilution region), the machine operator will choose which of the downstream wings to turn in, or even both, the initial shape of the blank being of course dependent upon the steps followed.

As an alternative to the shaping of the downstream wings of the blank by knurling to form the inner tongue 10 and the downstream wall 13a, the shaping may be effected by plastic deformation on an expanding press or on a drawing press using suitable tools.

The final machining operation in making the cooling film device consists of drilling several rows of holes 12 in the central radial part 11 by laser or electron beams.

The film device is then fixed in the combustion chamber wall by welding the end of its upstream wall 9 to an upstream portion 6a of the combustion chamber wall, and the end of its downstream wall 13a to a downstream portion 6b of the chamber wall.

The method thus described has made it possible to make cooling film devices in which the axial length is 20 mm or less for an inner shell diameter close to 600 mm, the radial width at the bottom of the settling chamber 14 is between 4 and 5 mm, e.g. 4.6 mm, the radial width of the outlet slit 15 is between 1 and 3 mm e.g. 2.5 mm, and the radial end part 11 of the chamber 14 is drilled for example with 3 rows of 1529 holes in staggered arrangement and each of 0.5 mm diameter.

The invention has thus made it possible to make cooling film devices of unitary construction and with dimensions smaller than those at present achieved, by simpler, and therefore less costly, means.

We claim:

1. A method of manufacturing a cooling film device of short length for a large diameter combustion chamber of an aircraft turbo-engine, said cooling film device comprising an upstream wall of substantially cylindrical shape, a downstream wall, a tongue extending downstream from said upstream wall, said downstream wall and said tongue defining therebetween an annular chamber and a downstream annular outlet slit from said chamber for communication with the inside of said combustion chamber, and means defining a plurality of air inlet holes to said annular chamber, said method including the steps of:

(a) making an annular blank on a lathe, said blank having an upstream part of generally cylindrical shape and an enlarged downstream part of generally cylindro-frusto-conical shape;

(b) machining in said downstream part a frusto-conical recess opening in the downstream direction, thereby providing said downstream part with an inner portion having an axis which merges with that of said blank, a radial portion, and an outer portion with double curvature bounding said recess, said inner and outer portions defining inner and outer downstream wings;

(c) deforming at least one of the said inner and outer downstream wings to form on the one hand said downstream wall of said cooling film device, and on the other hand said inner tongue, thereby defining said annular chamber and said outlet slit therefrom;

(d) drilling rows of holes in said radial portion separating said tongue and said downstream wall.

2. A method according to claim 1 for manufacturing a cooling film device for the inner shell of an annular combustion chamber, wherein said cylindro-frusto-conical downstream part of said blank formed in step (a) is orientated to diverge downstream relative to the axis of symmetry of said shell at an angle between 30 and 50 degrees.

3. A method according to claim 1 for manufacturing a cooling film device for the outer shell of an annular combustion chamber, wherein said frusto-conical downstream part of said blank formed in step (a) is orientated to converge downstream relative to the axis of symmetry of said shell at an angle $\alpha$ between 30 and 50 degrees.

4. A method according to claim 1, wherein said outer downstream wing has a central part and a downstream part, and said central part is deformed in step (c) whereby said annular chamber defines a convergent settling chamber and said downstream part of said outer wing becomes disposed parallel with said inner tongue to provide coaxial cylindrical faces defining said annular outlet slit.

5. A method according to claim 1, wherein said inner downstream wing machined in step (b) extends in frusto-conical manner relative t said upstream wall, and said inner wing is deformed in step (c) whereby said inner tongue is disposed parallel with the downstream part of said outer downstream wing, said annular chamber thereby defining a convergent settling chamber and said annular outlet slit therefrom being defined by coaxial cylindrical faces of said tongue and said downstream part of said outer wing.

6. A method according to claim 1, wherein said at least one of said inner and outer downstream wings of said blank is deformed in step (c) by spinning against a knurling wheel without extrusion of material.

7. A method according to claim 1, wherein said at least one of said inner and outer downstream wings of said blank is deformed to shape in step (c) by plastic deformation on a drawing press.

* * * * *

UNITED STATES PATENT AND TRADEMARK OFFICE
CERTIFICATE OF CORRECTION

PATENT NO. : 4,821,387
DATED : APRIL 18, 1989
INVENTOR(S) : PIERRE A.P. BOUILLOT ET AL

It is certified that error appears in the above-identified patent and that said Letters Patent is hereby corrected as shown below:

In column 2, line 15, delete ".";

line 54, change "Further" to -- Further--;

In cloumn 3, line 5, change "turboengine" to --turbo-engine--;

In column 6, line 20, change "angle between" to --angle $\alpha$ between--; and line 39, change "relative t" to --relative to--.

Signed and Sealed this

Fifteenth Day of May, 1990

Attest:

HARRY F. MANBECK, JR.

*Attesting Officer*　　　　*Commissioner of Patents and Trademarks*